(12) United States Patent
Fujiwara

(10) Patent No.: US 11,258,956 B2
(45) Date of Patent: Feb. 22, 2022

(54) IMAGE CAPTURING APPARATUS, IMAGE CAPTURING METHOD, AND PROGRAM

(71) Applicant: FUJIFILM Corporation, Tokyo (JP)

(72) Inventor: Shinya Fujiwara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 33 days.

(21) Appl. No.: 17/006,901

(22) Filed: Aug. 31, 2020

(65) Prior Publication Data

US 2020/0396369 A1 Dec. 17, 2020

Related U.S. Application Data

(63) Continuation of application No. PCT/JP2019/007290, filed on Feb. 26, 2019.

(30) Foreign Application Priority Data

Mar. 29, 2018 (JP) .............................. JP2018-065045

(51) Int. Cl.
*H04N 5/235* (2006.01)
*G06T 5/00* (2006.01)
(Continued)

(52) U.S. Cl.
CPC ........... *H04N 5/2353* (2013.01); *G06T 5/009* (2013.01); *G06T 5/50* (2013.01); *H04N 5/232* (2013.01);
(Continued)

(58) Field of Classification Search
CPC .... H04N 5/2353; H04N 5/232; H04N 5/2355; H04N 5/353; H04N 5/2351; H04N 5/243;
(Continued)

(56) References Cited

U.S. PATENT DOCUMENTS

2010/0053346 A1 3/2010 Mitsunaga
2010/0277631 A1 11/2010 Sugiyama
(Continued)

FOREIGN PATENT DOCUMENTS

JP 2007049227 2/2007
JP 2010062785 3/2010
(Continued)

OTHER PUBLICATIONS

"International Search Report (Form PCT/ISA/210) of PCT/JP2019/007290," dated Apr. 23, 2019, with English translation thereof, pp. 1-5.
(Continued)

*Primary Examiner* — Shahbaz Nazrul
(74) *Attorney, Agent, or Firm* — JCIPRNET

(57) ABSTRACT

An image capturing apparatus including: an imaging sensor and a processor configured to set a first exposure time and a second exposure time obtained by dividing the first exposure time by an integer m where m is an integer equal to or larger than 2; control the imaging sensor to capture frames successively by repeatedly performing exposure including at least exposure for one frame having the first exposure time and exposure for m frames having the second exposure time as one set; acquire image data of each frame from the imaging sensor; generate image data of an average frame that is an average of pieces of image data of the m frames having the second exposure time in the one set; and generate a composite frame for recording or displaying a motion picture of an extended dynamic range according to image data of the one frame having the first exposure time and the image data of the average frame.

18 Claims, 13 Drawing Sheets

(51) Int. Cl.
  *G06T 5/50* (2006.01)
  *H04N 5/232* (2006.01)
(52) U.S. Cl.
  CPC . *H04N 5/2355* (2013.01); *G06T 2207/20216* (2013.01)
(58) Field of Classification Search
  CPC . G06T 5/009; G06T 5/50; G06T 2207/20216; G06T 2207/20208; G06T 2207/20221; G03B 7/093
  See application file for complete search history.

(56) References Cited

U.S. PATENT DOCUMENTS

| | | | |
|---|---|---|---|
| 2012/0188392 A1* | 7/2012 | Smith | H04N 5/2355 348/222.1 |
| 2013/0208147 A1 | 8/2013 | Koshiba | |
| 2014/0063330 A1* | 3/2014 | Matsuyama | H04N 5/232133 348/352 |
| 2014/0218575 A1 | 8/2014 | Yanai | |
| 2015/0207973 A1* | 7/2015 | Iwasaki | H04N 5/2353 348/229.1 |
| 2016/0323524 A1 | 11/2016 | Smith et al. | |
| 2016/0381302 A1* | 12/2016 | Shikata | H04N 5/2356 348/239 |
| 2017/0078557 A1* | 3/2017 | Kawabata | H01L 27/14643 |
| 2018/0124297 A1* | 5/2018 | Matsuhashi | H04N 5/2353 |
| 2019/0387187 A1* | 12/2019 | Gyotoku | H04N 5/379 |

FOREIGN PATENT DOCUMENTS

| | | |
|---|---|---|
| JP | 2010279016 | 12/2010 |
| JP | 2011234318 | 11/2011 |
| JP | 2011244309 | 12/2011 |
| JP | 2011259375 | 12/2011 |
| JP | 2014171207 | 9/2014 |
| WO | 2012042967 | 4/2012 |

OTHER PUBLICATIONS

"Written Opinion of the International Searching Authority (Form PCT/ISA/237) of PCT/JP2019/007290," dated Apr. 23, 2019, with English translation thereof, pp. 1-10.

* cited by examiner

FIG. 12
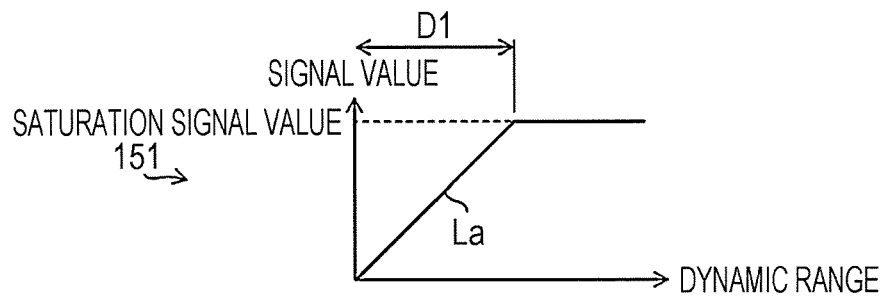
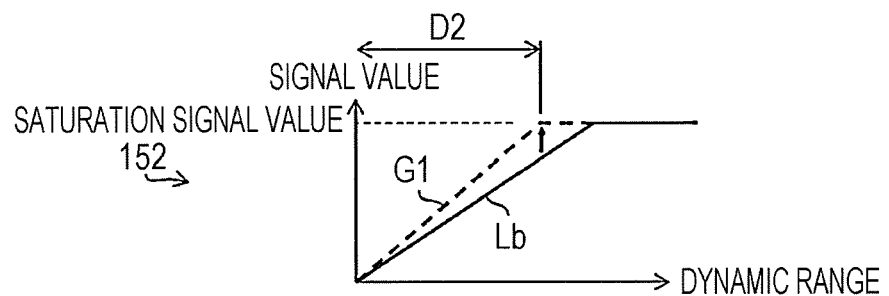
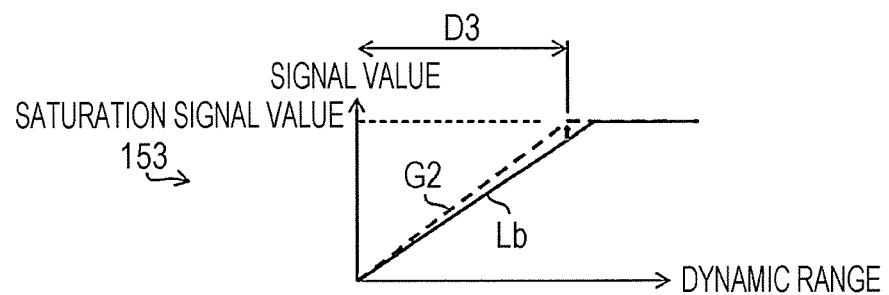
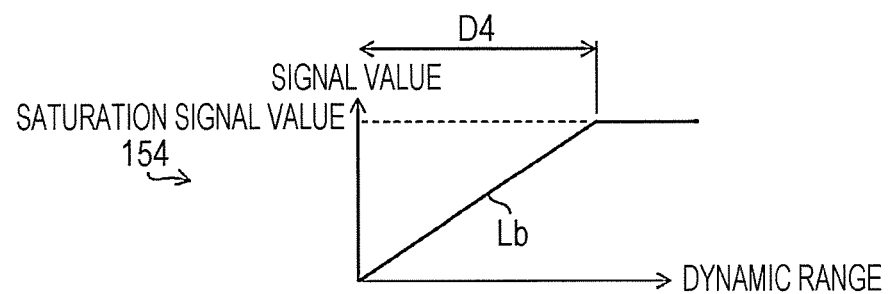

FIG. 15
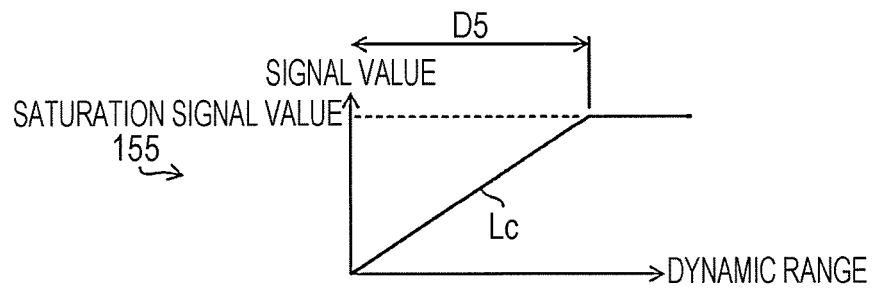
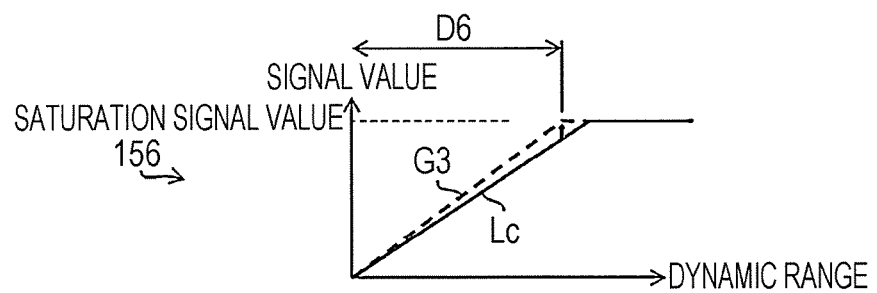
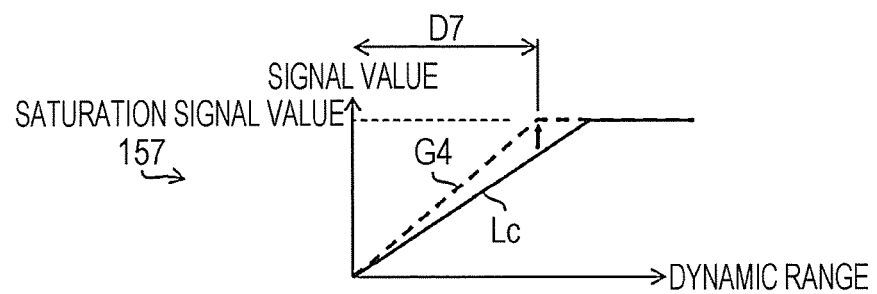
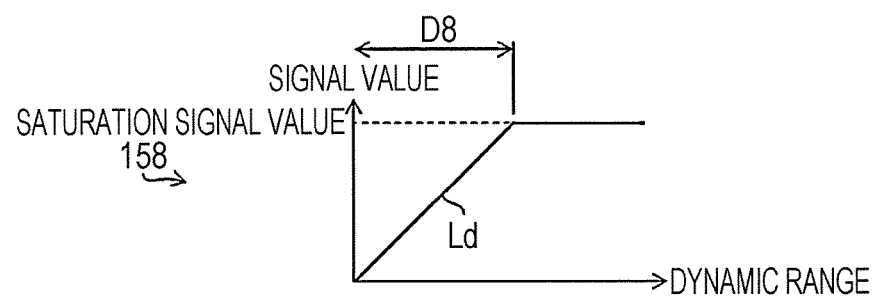

IMAGE CAPTURING APPARATUS, IMAGE CAPTURING METHOD, AND PROGRAM

CROSS-REFERENCE TO RELATED APPLICATIONS

This application is a Continuation of PCT International Application No. PCT/JP2019/007290 filed on Feb. 26, 2019, which claims priority under 35 U.S.C § 119(a) to Japanese Patent Application No. 2018-065045 filed on Mar. 29, 2018. Each of the above applications is hereby expressly incorporated by reference, in its entirety, into the present application.

BACKGROUND OF THE INVENTION

1. Field of the Invention

The present invention relates to an image capturing apparatus, an image capturing method, and a non-transitory computer readable medium for storing a program and specifically relates to a technique for acquiring a motion picture for which dynamic range extension processing is performed.

2. Description of the Related Art

When, for example, a digital camera is used to acquire a captured image of a photographic subject (or a scene) of a wide dynamic range, blown-out highlights in a highlight part or blocked-up shadows in a shadow part may appear. As a method for suppressing such blown-out highlights and blocked-up shadows to express the dynamic range of the photographic subject wider, dynamic range extension processing (HDR (high-dynamic-range) processing) is available.

For example, JP2011-259375A describes a technique in which a long-exposure image and a short-exposure image are combined to acquire a motion picture of a wide dynamic range (extended dynamic range). The technique described in JP2011-259375A is intended to eliminate unnatural movement of a moving object in the motion picture caused by the difference between a blank period (exposure interval) from the end of long exposure to the start of short exposure and a blank period from the end of short exposure to the start of long exposure, and the technique is used to make the above-described two blank periods equal to each other.

SUMMARY OF THE INVENTION

To acquire a composite image of a wide dynamic range, a plurality of images for which the luminous exposures are different need to be acquired. As a method for acquiring images for which the luminous exposures are different, for example, a method of making the sensitivity different and a method of making the exposure time different are available.

In the method of making the sensitivity different, a large-luminous-exposure image (the luminous exposure is large) is acquired with high sensitivity and a small-luminous-exposure image (the luminous exposure is small) is acquired with low sensitivity to acquire pieces of image data for which the luminous exposures are different. With this method, the exposure time for large luminous exposure and that for small luminous exposure are equal to each other, and the amount of movement in a shadow part and that in a highlight part become equal to each other. However, the sensitivity that can be attained by a camera has a limit, and low-sensitivity image capturing for acquiring a small-luminous-exposure image might not be possible in a bright scene. For example, in a case of capturing a large-luminous-exposure image with an ISO sensitivity of 100 and a small-luminous-exposure image with an ISO sensitivity of 50 to acquire images for which the luminous exposures are different, when a camera not capable of decreasing the ISO sensitivity to 50 or lower is used, it is not possible to acquire the small-luminous-exposure image.

On the other hand, in the method of making the exposure time different, to acquire a small-luminous-exposure image, the exposure time needs to be made shorter, and a small-luminous-exposure image can be acquired even in a bright scene. However, the exposure time of a large-luminous-exposure image and that of a small-luminous-exposure image are different, and therefore, the amount of movement of a moving object in a shadow part and that in a highlight part are different, which appears unnatural. For example, in a case where the difference between large luminous exposure and small luminous exposure is 1 EV, the exposure time for small luminous exposure is half the exposure time for large luminous exposure. In a case of capturing an image of a moving object, the amount of movement in small luminous exposure (highlight part) is half the amount of movement in large luminous exposure (shadow part). Accordingly, in an image of a wide dynamic range acquired by combining a large-luminous-exposure image and a small-luminous-exposure image, the amount of movement of a moving object in a shadow part and that in a highlight part are different, which appears unnatural.

The present invention has been made in view of the above-described circumstances, and an object thereof is to provide an image capturing apparatus, an image capturing method, and a non-transitory computer readable medium for storing a program with which, in a case of acquiring an image of a wide dynamic range by combining images for which the luminous exposures are made different by controlling the exposure time, a motion picture of a wide dynamic range in which movement of a moving object is natural can be acquired.

To achieve the above-described object, an image capturing apparatus according to an aspect of the present invention includes: an imaging unit; an exposure time setting unit that sets a first exposure time and a second exposure time shorter than the first exposure time, the second exposure time being an exposure time obtained by dividing the first exposure time by an integer m where m is an integer equal to or larger than 2, the exposure time setting unit setting the first exposure time and the second exposure time; an exposure control unit that controls exposure for frames successively captured by the imaging unit, the exposure control unit repeatedly performing at least exposure for one frame having the first exposure time and exposure for m frames having the second exposure time as one set to control exposure; an image data acquisition unit that acquires image data of each frame from the imaging unit for which exposure is controlled; an image data generation unit that generates image data of an average frame that is an average of pieces of image data of the m frames having the second exposure time in the one set; and a composite frame generation unit that uses image data of the one frame having the first exposure time and the image data of the average frame to generate a composite frame for recording or displaying a motion picture of an extended dynamic range.

According to this aspect, the image data generation unit generates image data of an average frame that is the average of pieces of image data of m frames having the second exposure time in one set, and the composite frame generation unit uses image data of one frame having the first exposure time and the image data of the average frame to generate a composite frame for recording or displaying a motion picture of an extended dynamic range. Accordingly, in this aspect, the average frame for which the exposure time is the same as the first exposure time but the luminous exposure is smaller than that of one frame having the first exposure time is used to generate a composite frame.

Preferably, the image capturing apparatus further includes a blown-out highlight proportion calculation unit that calculates a proportion of blown-out highlight pixels in at least one of the image data of the one frame having the first exposure time or image data of one frame having the second exposure time, and the exposure time setting unit makes an increase change or a decrease change to the integer m in a next set on the basis of the proportion of blown-out highlight pixels.

According to this aspect, the blown-out highlight proportion calculation unit calculates the proportion of blown-out highlight pixels in at least one of image data of one frame having the first exposure time or image data of one frame having the second exposure time, and the exposure time setting unit makes an increase change or a decrease change to the integer m in the next set on the basis of the proportion of blown-out highlight pixels. Accordingly, in this aspect, the integer m is changed in accordance with the proportion of blown-out highlight pixels in the captured image.

Preferably, the exposure time setting unit makes an increase change to the integer m in the next set in a case where the proportion of blown-out highlight pixels is equal to or larger than a predetermined threshold value, and makes a decrease change to the integer m in the next set in a case where the proportion of blown-out highlight pixels is equal to or smaller than a predetermined threshold value.

According to this aspect, the exposure time setting unit makes an increase change to the integer m in the next set in a case where the proportion of blown-out highlight pixels is equal to or larger than a predetermined threshold value, and makes a decrease change to the integer m in the next set in a case where the proportion of blown-out highlight pixels is equal to or smaller than a predetermined threshold value.

Preferably, the exposure time setting unit makes the increase change in a case where the proportion of blown-out highlight pixels is equal to or larger than a first threshold value and sets the second exposure time to an exposure time obtained by dividing the first exposure time by an integer m+1 in the next set, and makes the decrease change in a case where the proportion of blown-out highlight pixels is equal to or smaller than a second threshold value and sets the second exposure time to an exposure time obtained by dividing the first exposure time by an integer m−1 in the next set.

According to this aspect, the exposure time setting unit makes an increase change in a case where the proportion of blown-out highlight pixels is equal to or larger than the first threshold value and sets the second exposure time to an exposure time obtained by dividing the first exposure time by the integer m+1 in the next set, and makes a decrease change in a case where the proportion of blown-out highlight pixels is equal to or smaller than the second threshold value and sets the second exposure time to an exposure time obtained by dividing the first exposure time by the integer m−1 in the next set.

Preferably, the image capturing apparatus further includes a check image data generation unit that applies a check image digital gain to image data of one frame having the second exposure time before the decrease change is made to generate blown-out highlight check image data in a case where the decrease change is made, the blown-out highlight proportion calculation unit calculates a proportion of blown-out highlight pixels in the blown-out highlight check image data, and the exposure time setting unit makes the decrease change in a case where the proportion of blown-out highlight pixels in the blown-out highlight check image data is equal to or smaller than a third threshold value.

According to this aspect, the check image data generation unit applies a check image digital gain to image data of one frame having the second exposure time before a decrease change is made to generate blown-out highlight check image data in a case where a decrease change is made, and the exposure time setting unit makes the decrease change in a case where the proportion of blown-out highlight pixels in the blown-out highlight check image data is equal to or smaller than the third threshold value. Accordingly, in this aspect, the proportion of blown-out highlight pixels after a decrease change to the integer m is checked with the blown-out highlight check image data before the decrease change is made.

Preferably, the check image data generation unit applies the check image digital gain of m/(m−1)-fold to the image data of the one frame having the second exposure time to generate the blown-out highlight check image data, and the exposure time setting unit sets the second exposure time in the next set to an exposure time obtained by dividing the first exposure time by an integer m−1 in a case where the proportion of blown-out highlight pixels in the blown-out highlight check image data is equal to or smaller than the third threshold value.

According to this aspect, the check image data generation unit applies the check image digital gain of m/(m−1)-fold to image data of one frame having the second exposure time to generate the blown-out highlight check image data, and the exposure time setting unit sets the second exposure time in the next set to an exposure time obtained by dividing the first exposure time by the integer m−1 in a case where the proportion of blown-out highlight pixels in the blown-out highlight check image data is equal to or smaller than the third threshold value.

Preferably, the image capturing apparatus further includes a first gain-up image data generation unit that performs a first gain-up process for the image data of the average frame after the increase change has been made to generate first gain-up image data in a case where the increase change has been made by the exposure time setting unit, the first gain-up image data generation unit generating the first gain-up image data for which a first digital gain in the first gain-up process is decreased in a stepwise manner in accordance with a frame rate for recording or displaying the motion picture, and the composite frame generation unit uses the first gain-up image data as the image data of the average frame to generate the composite frame.

According to this aspect, the first gain-up image data generation unit generates first gain-up image data for which the first digital gain in the first gain-up process is decreased in a stepwise manner in accordance with a frame rate for recording or displaying a motion picture, and the composite frame generation unit uses the first gain-up image data as the image data of the average frame to generate the composite frame. Accordingly, in this aspect, the dynamic range can be changed smoothly.

Preferably, the first gain-up image data generation unit decreases the first digital gain from m_b/m_a-fold to 1-fold in a stepwise manner in a case of the increase change from an integer m_a to an integer m_b.

According to this aspect, the first gain-up image data generation unit decreases the first digital gain from $m\_b/m\_a$-fold to 1-fold in a stepwise manner in a case of an increase change from the integer $m\_a$ to the integer $m\_b$.

Preferably, the image capturing apparatus further includes a second gain-up image data generation unit that performs a second gain-up process for the image data of the average frame before the decrease change is made to generate second gain-up image data in a case where the decrease change has been made by the exposure time setting unit, the second gain-up image data generation unit generating the second gain-up image data for which a second digital gain in the second gain-up process is increased in a stepwise manner in accordance with a frame rate for recording or displaying the motion picture, and the composite frame generation unit uses the second gain-up image data as the image data of the average frame to generate the composite frame.

According to this aspect, the second gain-up image data generation unit generates second gain-up image data for which the second digital gain in the second gain-up process is increased in a stepwise manner in accordance with a frame rate for recording or displaying a motion picture, and the composite frame generation unit uses the second gain-up image data as the image data of the average frame to generate the composite frame.

Preferably, the second gain-up image data generation unit increases the second digital gain from 1-fold to $m\_c/m\_d$-fold in a stepwise manner in a case of the decrease change from an integer $m\_c$ to an integer $m\_d$.

According to this aspect, the second gain-up image data generation unit increases the second digital gain from 1-fold to $m\_c/m\_d$-fold in a stepwise manner in a case of a decrease change from the integer $m\_c$ to the integer $m\_d$.

An image capturing method according to another aspect of the present invention includes: an exposure time setting step of setting a first exposure time and a second exposure time shorter than the first exposure time, the second exposure time being an exposure time obtained by dividing the first exposure time by an integer m where m is an integer equal to or larger than 2, the exposure time setting step setting the first exposure time and the second exposure time; an exposure control step of controlling exposure for frames successively captured by an imaging unit, the exposure control step repeatedly performing at least exposure for one frame having the first exposure time and exposure for m frames having the second exposure time as one set to control exposure; an image data acquisition step of acquiring image data of each frame from the imaging unit for which exposure is controlled; an image data generation step of generating image data of an average frame that is an average of pieces of image data of the m frames having the second exposure time in the one set; and a composite frame generation step of using image data of the one frame having the first exposure time and the image data of the average frame to generate a composite frame for recording or displaying a motion picture of an extended dynamic range.

A non-transitory computer readable medium for storing a program according to yet another aspect of the present invention causes a computer to perform an image capturing method including: an exposure time setting step of setting a first exposure time and a second exposure time shorter than the first exposure time, the second exposure time being an exposure time obtained by dividing the first exposure time by an integer m where m is an integer equal to or larger than 2, the exposure time setting step setting the first exposure time and the second exposure time; an exposure control step of controlling exposure for frames successively captured by an imaging unit, the exposure control step repeatedly performing at least exposure for one frame having the first exposure time and exposure for m frames having the second exposure time as one set to control exposure; an image data acquisition step of acquiring image data of each frame from the imaging unit for which exposure is controlled; an image data generation step of generating image data of an average frame that is an average of pieces of image data of the m frames having the second exposure time in the one set; and a composite frame generation step of using image data of the one frame having the first exposure time and the image data of the average frame to generate a composite frame for recording or displaying a motion picture of an extended dynamic range.

According to the present invention, the image data generation unit generates image data of an average frame that is the average of pieces of image data of m frames having the second exposure time in one set, and the composite frame generation unit uses image data of one frame having the first exposure time and the image data of the average frame to generate a composite frame for recording or displaying a motion picture of an extended dynamic range. Accordingly, the average frame for which the exposure time is the same as the first exposure time but the luminous exposure is smaller than that of one frame having the first exposure time is used to generate a composite frame. Therefore, a composite frame in which the amount of movement of a moving object in a shadow part and that in a highlight part are equal to each other and movement of the moving object is natural can be generated.

BRIEF DESCRIPTION OF THE DRAWINGS

FIG. 12 includes diagrams for explaining first gain-up image data and dynamic range changes;

FIG. 15 includes diagrams for explaining second gain-up image data and dynamic range changes.

DESCRIPTION OF THE PREFERRED EMBODIMENTS

Hereinafter, preferred embodiments of an image capturing apparatus, an image capturing method, and a program according to the present invention will be described with reference to the attached drawings.

Figure 1:
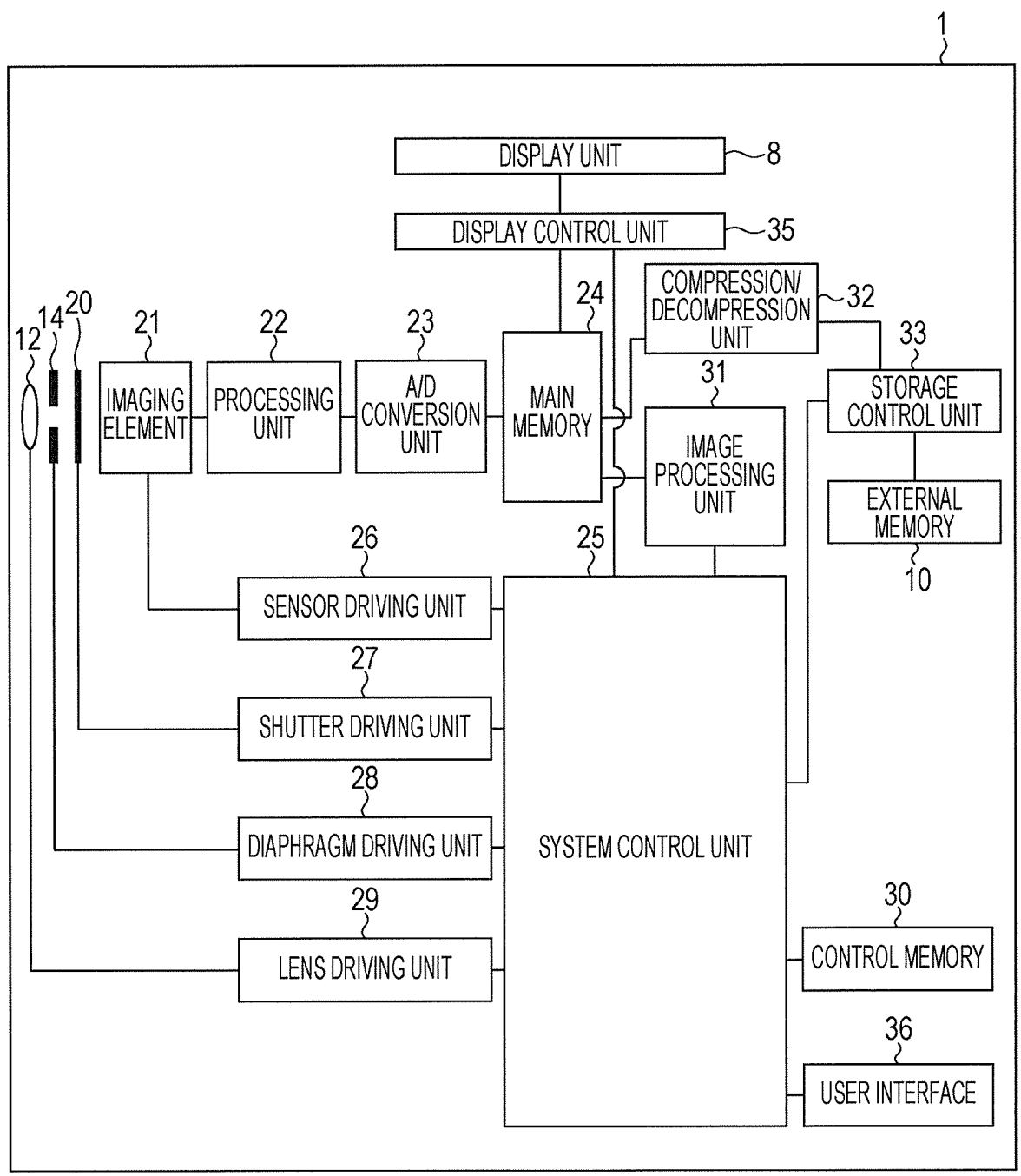
FIG. 1 is a block diagram illustrating a control processing system of an image capturing apparatus.

FIG. 1 is a block diagram illustrating a control processing system of an image capturing apparatus 1.

Photographic subject light passes through a lens 12, a diaphragm 14, and a mechanical shutter 20 and is received by an imaging element (imaging unit) 21. The lens 12 is formed of an image capture optical system including an image capture lens and the diaphragm 14.

The imaging element 21 is an element that receives light of a photographic subject image to generate image capture signals (image data), and has color filters of, for example, R, G, and B (red, green, and blue) and an image sensor, such as a CCD (charge-coupled device) image sensor or a CMOS (complementary metal-oxide semiconductor) image sensor, that converts an optical image to electric signals. The image data output from the imaging element 21 is input to a processing unit 22 and is subjected to processing by, for example, an AGC (automatic gain control) circuit, and thereafter, the image data, which is analog data, is converted to digital image data by an A/D (analog/digital) conversion unit 23. The digital image data is saved in a main memory 24.

The main memory 24 is an area for temporarily storing image data and is formed of, for example, a DRAM (dynamic random access memory). The image data sent from the A/D conversion unit 23 and stored in the main memory 24 is read by an image processing unit 31 that is controlled by a system control unit 25.

The image processing unit 31 uses the image data generated by the imaging element 21 as input image data to perform various types of image processing including white balance correction, gamma correction, and demosaicing and save the image data after image processing in the main memory 24 again.

The image processing unit 31 generates a composite frame of an extended dynamic range. The configuration of the image processing unit 31 will be described in detail below.

Note that a composite frame subjected to dynamic range extension processing is hereinafter referred to as "composite frame". Further, a composite frame of a wide dynamic range is formed of frames, which are referred to as "composition target frames".

The image data subjected to image processing by the image processing unit 31 and saved in the main memory 24 is read by a display control unit 35 and a compression/decompression unit 32. The display control unit 35 controls a display unit 8 to display the image data read from the main memory 24 on the display unit 8. Accordingly, the image data output from the imaging element 21 and subjected to image processing by the image processing unit 31 is displayed on the display unit 8 as an image-capture check image (post-view image).

The compression/decompression unit 32 performs compression processing on the image data read from the main memory 24 to generate image data in any compression format, such as JPEG (Joint Photographic Experts Group) or TIFF (Tagged Image File Format). The image data after compression processing is stored in an external memory 10 by a storage control unit 33 that controls data storage processing for storage in the external memory 10 and data read processing for reading from the external memory 10. Image-capture information in any format is added to image data. As the format, for example, Exif (Exchangeable image file format) can be employed.

When a push of a shutter button in a first step (half push) is detected, an AF processing function of the image capturing apparatus 1 integrates the absolute values of high-frequency components of image data corresponding to an AF area that are taken at the time of half push, and outputs the integrated value (AF evaluation value) to the system control unit 25.

When a push of the shutter button in the first step (half push) is detected, an AE detection function integrates digital signals corresponding to the entire screen or integrates image data in which the center part and the edge part of the screen are differently weighted, and outputs the integrated value to the system control unit 25.

As described above, the system control unit 25 controls the main memory 24, the image processing unit 31, and the storage control unit 33 and also controls other parts (AF processing function and AE detection function) of the image capturing apparatus 1.

When the shutter button is half-pushed in an auto-image capture mode, the system control unit 25 activates the AE detection function. The system control unit 25 calculates the luminance of the photographic subject (image-capture EV value) on the basis of the integrated value input from the AE detection function, and determines the aperture of the diaphragm 14 to be driven via a diaphragm driving unit 28 and the shutter speed (of the mechanical shutter 20 and/or the charge storage time of the imaging element 21) on the basis of the image-capture EV value in accordance with a program diagram.

When the shutter button is fully pushed, the system control unit 25 controls the diaphragm 14 on the basis of the determined aperture and controls the mechanical shutter 20 via a shutter driving unit 27 on the basis of the determined shutter speed. The charge storage time of the imaging element 21 is controlled by a sensor driving unit 26.

When the shutter button is half-pushed in the auto-image capture mode, the system control unit 25 moves a focus lens of the lens 12 from a close point to the infinity side via a lens driving unit 29 and activates the AF processing function to acquire an AF evaluation value at each lens position from the AF processing function. The system control unit 25 searches for an in-focus position at which the AF evaluation value is at its maximum, and moves the focus lens to the in-focus position, thereby adjusting the focal point for the photographic subject. The system control unit 25 acquires information about the in-focus position on the basis of the position to which the focus lens is moved.

The system control unit 25 acquires operation signals from a user interface 36 that includes the shutter button, a power switch, and an operation unit, and performs various types of processing and device control corresponding to the operation signals.

Programs and data necessary for the various types of processing and device control performed by the system control unit 25 are stored in the main memory 24. The system control unit 25 can read programs and data stored in a control memory 30 and save new programs and data in the control memory 30 as necessary.

Figure 2:
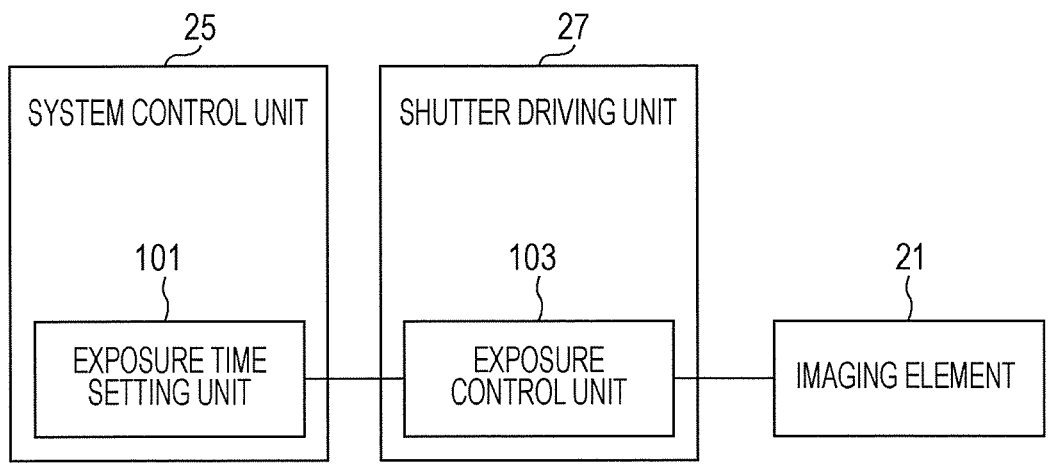
FIG. 2 is a block diagram illustrating an example functional configuration related to exposure time setting and exposure control.

Now, exposure time setting and exposure control according to the present invention are described. FIG. 2 is a block diagram illustrating an example functional configuration related to the exposure time setting and exposure control.

The system control unit 25 includes an exposure time setting unit 101. The exposure time setting unit 101 sets a first exposure time and a second exposure time shorter than the first exposure time. When m is an integer equal to or larger than 2, the second exposure time is an exposure time obtained by dividing the first exposure time by the integer m, and the exposure time setting unit 101 sets the first exposure time and the second exposure time. Note that the second exposure time need not exactly match with the exposure time obtained by dividing the first exposure time by the integer m, and it is sufficient that the second exposure time is an exposure time close to the exposure time obtained by dividing the first exposure time by the integer m.

The shutter driving unit 27 has an exposure control unit 103 for exposure control in the imaging element 21. The exposure control unit 103 controls exposure for frames successively captured by the imaging element 21. Specifically, the exposure control unit 103 repeatedly performs at least exposure for one frame having the first exposure time and exposure for m frames having the second exposure time as one set to control exposure.

First Embodiment

Figure 3:
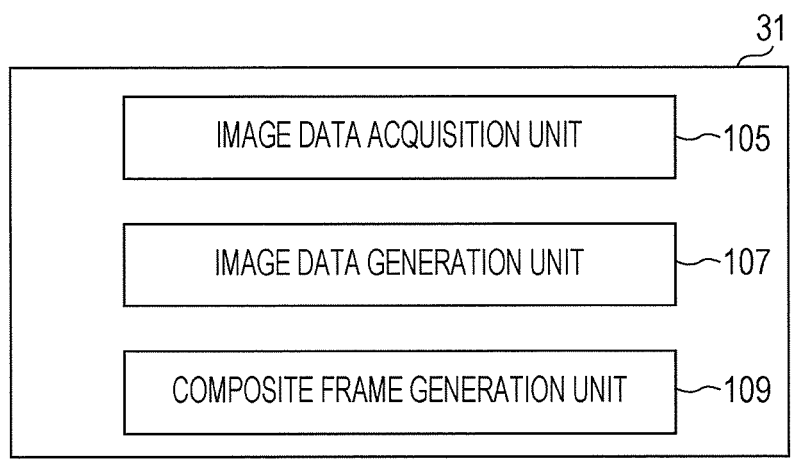
FIG. 3 is a block diagram illustrating an example functional configuration of an image processing unit.

FIG. 3 is a block diagram illustrating an example functional configuration of the image processing unit 31 according to a first embodiment. The image processing unit 31 includes an image data acquisition unit 105, an image data generation unit 107, and a composite frame generation unit 109.

The image data acquisition unit 105 acquires image data of each frame from the imaging unit for which exposure is controlled. Specifically, the image data acquisition unit 105 acquires from the main memory 24 one after another, pieces of image data of one frame having the first exposure time and frames having the second exposure time that are output from the imaging element 21.

The image data generation unit 107 generates an average frame, which is a composition target frame. The image data generation unit 107 generates image data of the average frame that is the average of pieces of image data of m frames having the second exposure time in one set, where m is an integer equal to or larger than 2. The average frame will be described in detail below.

The composite frame generation unit 109 uses the image data of the one frame having the first exposure time and the image data of the average frame to generate a composite frame for recording or displaying a motion picture of an extended dynamic range.

Now, exposure time setting according to the related art in a case of acquiring composition target frames is described.

Figure 4:
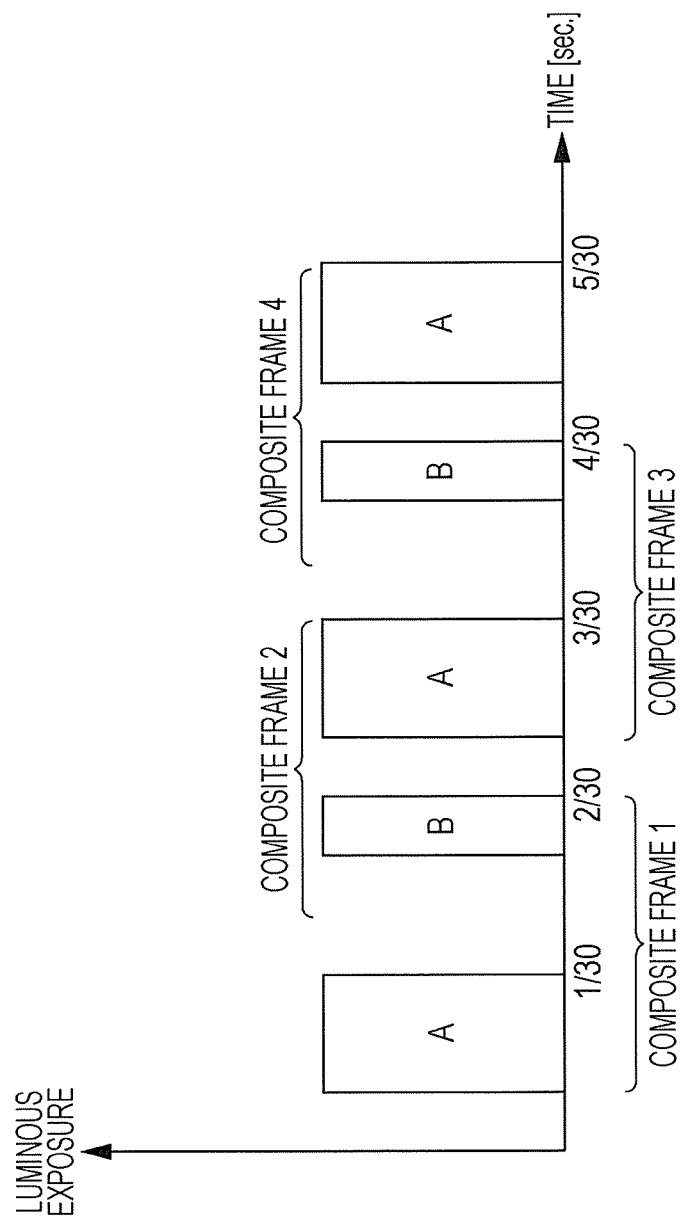
FIG. 4 is a diagram for explaining a method for exposure time setting according to the related art.

FIG. 4 is a diagram for explaining a method for exposure time setting according to the related art. In FIG. 4, the vertical axis represents a luminous exposure per unit time, and the horizontal axis represents the time.

A composite frame is formed of composition target frames, namely, a frame for which the luminous exposure is large (frame A) and a frame for which the luminous exposure is small (frame B). The frame A and the frame B are captured at 30 fps (frames per second) and acquired at intervals of 1/30 second. Note that the frame A and the frame B are acquired with the same ISO sensitivity and the same aperture (f number) and become frames for which the luminous exposures are different by changing the exposure times.

The exposure time of the frame A is set to a seconds, and the exposure time of the frame B is set to b seconds shorter than a seconds. Each of the composite frames (composite frames 1, 2, 3, and 4) are formed of the frame A and the frame B adjacent to each other. In a composite frame, image data of the frame A is used in a shadow part and image data of the frame B is used in a highlight part. Therefore, when the exposure time of the frame A and that of the frame B are different, the amount of movement of a moving object is different in the composite frame, and the composite frame becomes unnatural.

Now, exposure time setting according to the present invention in a case of acquiring composition target frames is described.

Figure 5:
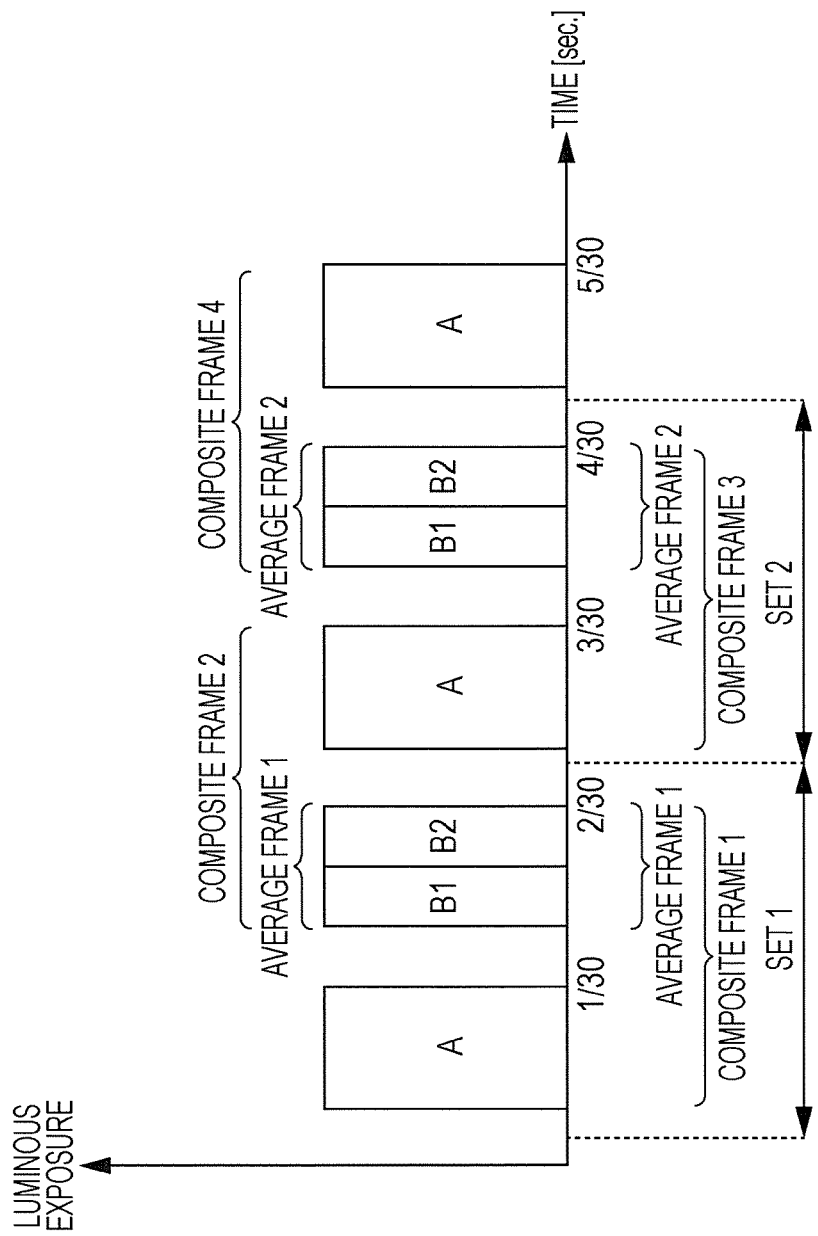
FIG. 5 is a diagram for explaining exposure for composition target frames that form a composite frame according to the present embodiment.

FIG. 5 is a diagram for explaining exposure for composition target frames that form a composite frame according to this embodiment. In FIG. 5, the vertical axis and the horizontal axis the same as those in FIG. 4 are illustrated.

In the case illustrated in FIG. 5, exposure for the frame A, a frame B1, and a frame B2 is performed in one set, and pieces of image data of the respective frames are acquired. The exposure time of the frame A is a seconds (corresponding to the first exposure time), and the exposure times of both the frame B1 and the frame B2 are b seconds (a/2 seconds) (corresponding to the second exposure time). The exposure time of b seconds is obtained by dividing the exposure time of the frame A, namely, a seconds, by m=2. Here, the average frame is formed of two frames, namely, the frame B1 and the frame B2, and therefore, m=2 holds. The average frame is generated by averaging the pieces of image data of the frame B1 and the frame B2, and therefore, has information indicating that the exposure time thereof is equal to that of the frame A and the luminous exposure thereof is half the luminous exposure of the frame A. Note that one set refers to the timing when exposure is performed for the frame A and m frames B, a set 1 and a set 2 are illustrated in FIG. 5, and the set is repeated as image capturing continues.

Each of the composite frames 1, 2, 3, and 4 are generated from the frame A and the average frame adjacent to each other. Accordingly, the average frame is generated from the frames B1 and B2 in each set, and the composite frame is generated from the average frame and the frame A. In a specific example of composition target frames for which the exposure time ratio is 1 to 1/2 (different by 1 EV), the exposure time a of the frame A is 1/45 second, and the exposure times b of the frames B1 and B2 are 1/90 second.

Figure 6:
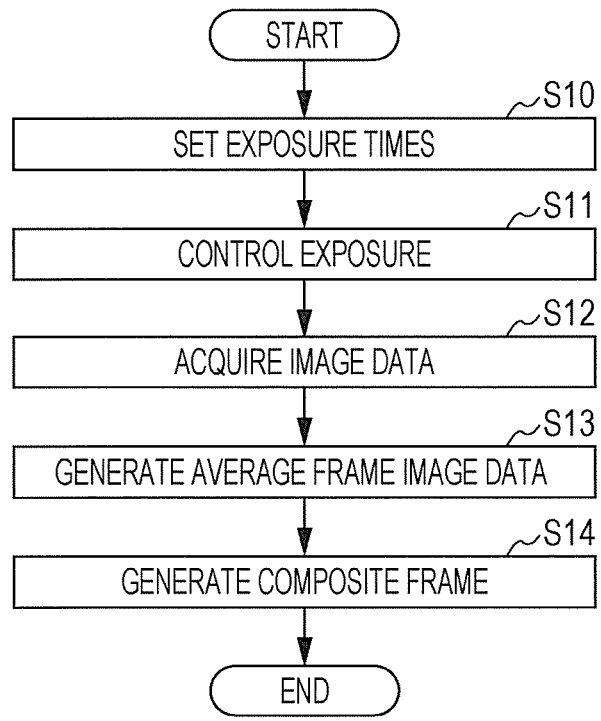
FIG. 6 is a flowchart illustrating a process in which image capturing explained with reference to FIG. 5 is performed by the image capturing apparatus.

Now, an operation process by the image capturing apparatus 1 (corresponding to the image capturing method of the present invention) is described. FIG. 6 is a flowchart illustrating a process in which image capturing explained with reference to FIG. 5 is performed by the image capturing apparatus 1.

The exposure time setting unit 101 sets the exposure times of the frames A, B1, and B2 (step S10: exposure time setting step). The exposure times of the frames A, B1, and B2 are set such that the exposure time of the frame A is a seconds and those of the frames B1 and B2 are b seconds (a/2 seconds).

Thereafter, the exposure control unit 103 controls exposure on the basis of the exposure times set by the exposure time setting unit 101 (step S11: exposure control step). Specifically, exposure is performed by performing exposure for the frame A, the frame B1 and the frame B2 as one set and repeating the set. Next, the image data acquisition unit 105 acquires pieces of image data of the frame A, the frame B1 and the frame B2 (step S12: image data acquisition step).

The image data generation unit 107 averages the pieces of image data of the frame B1 and the frame B2 in one set to generate the average frame (step S13: image data generation step). Thereafter, the composite frame generation unit 109 generates a composite frame from the pieces of image data of the frame A and the average frame (step S14: composite frame generation step).

According to this embodiment, the average frame for which the exposure time is the same as the first exposure time but the luminous exposure is smaller than that of one frame having the first exposure time is used as a composition target frame to generate a composite frame. Therefore, a composite frame in which the amount of movement of a moving object in a shadow part and that in a highlight part are equal to each other and movement of the moving object is natural can be generated.

In the above-described embodiment, the hardware configuration of the processing units that perform various types of processing is implemented as various processors as described below. The various processors include a CPU (central processing unit), which is a general-purpose processor executing software (program) to function as various processing units, a programmable logic device (PLD), such as an FPGA (field-programmable gate array), which is a processor having a circuit configuration that is changeable after manufacture, and a dedicated electric circuit, such as an ASIC (application-specific integrated circuit), which is a processor having a circuit configuration specifically designed to perform specific processing.

One processing unit may be configured as one of the various processors or two or more processors of the same type or different types (for example, a plurality of FPGAs or a combination of a CPU and an FPGA). Further, a plurality of processing units may be configured as one processor. As the first example of configuring a plurality of processing units as one processor, a form is possible where one or more CPUs and software are combined to configure one processor, and the processor functions as the plurality of processing units, a representative example of which is a computer, such as a client or a server. As the second example thereof, a form is possible where a processor is used in which the functions of the entire system including the plurality of processing units are implemented as one IC (integrated circuit) chip, a representative example of which is a system on chip (SoC). As described above, regarding the hardware configuration, the various processing units are configured by using one or more of the various processors described above.

Further, the hardware configuration of the various processors is more specifically an electric circuit (circuitry) in which circuit elements, such as semiconductor elements, are combined.

The above-described configurations and functions can be implemented as any hardware, software, or a combination thereof as appropriate. For example, the present invention is applicable to a program that causes a computer to perform the above-described processing steps (processing procedure), a computer-readable recording medium (non-transitory recording medium) to which such a program is recorded, or a computer on which such a program can be installed.

Second Embodiment

Now, a second embodiment of the present invention is described. In this embodiment, the integer m that is used to determine the second exposure time is changed in accordance with the proportion of blown-out highlight pixels in acquired image data.

Figure 7:
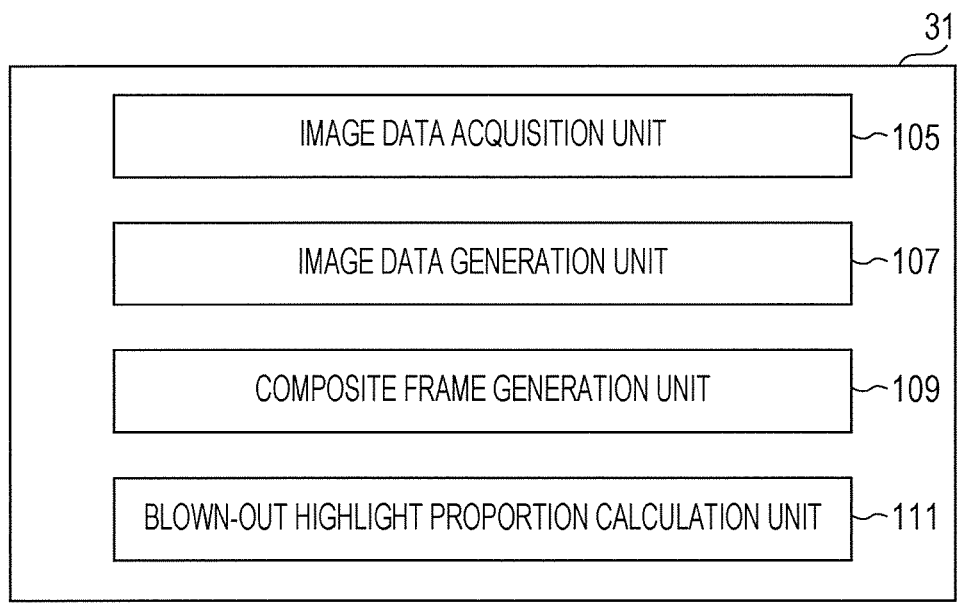
FIG. 7 is a block diagram illustrating an example functional configuration of the image processing unit.

FIG. 7 is a block diagram illustrating an example functional configuration of the image processing unit 31 according to this embodiment. The image processing unit 31 includes the image data acquisition unit 105, the image data generation unit 107, the composite frame generation unit 109, and a blown-out highlight proportion calculation unit 111. The units already explained with reference to FIG. 3 are assigned the same reference numerals, and descriptions thereof are omitted.

The blown-out highlight proportion calculation unit 111 calculates the proportion of blown-out highlight pixels in at least one of image data of the frame A (one frame having the first exposure time) or image data of the frame B1 or the frame B2 (one frame having the second exposure time). That is, the blown-out highlight proportion calculation unit 111 calculates the proportion of blown-out highlight pixels in image data of the frame A, the proportion of blown-out highlight pixels in image data of the frame B1 or the frame B2, or the proportion of blown-out highlight pixels in pieces of image data of the frame A, the frame B1, and the frame B2 in the same set. Here, a blown-out highlight pixel is a pixel in which a charge is stored to saturation. The exposure time setting unit 101 makes an increase change or a decrease change to the integer m in the next set on the basis of the calculated proportion of blown-out highlight pixels.

Specifically, in a case where the proportion of blown-out highlight pixels is equal to or larger than a first threshold value, the exposure time setting unit 101 makes an increase change and sets the second exposure time to an exposure time obtained by dividing the first exposure time by an integer m+1 in the next set. Accordingly, in the next set, the second exposure time becomes shorter, and a composite frame in which the proportion of blown-out highlight pixels is reduced can be generated. In a case where the proportion of blown-out highlight pixels is equal to or smaller than a second threshold value, the exposure time setting unit 101 makes a decrease change and sets the second exposure time to an exposure time obtained by dividing the first exposure time by an integer m−1 in the next set. Accordingly, the second exposure time becomes longer, and the amount of digital gain-up decreases. As a consequence, a composite frame in which noise is reduced can be generated. Note that m−1 is an integer equal to or larger than 2.

Figure 8:
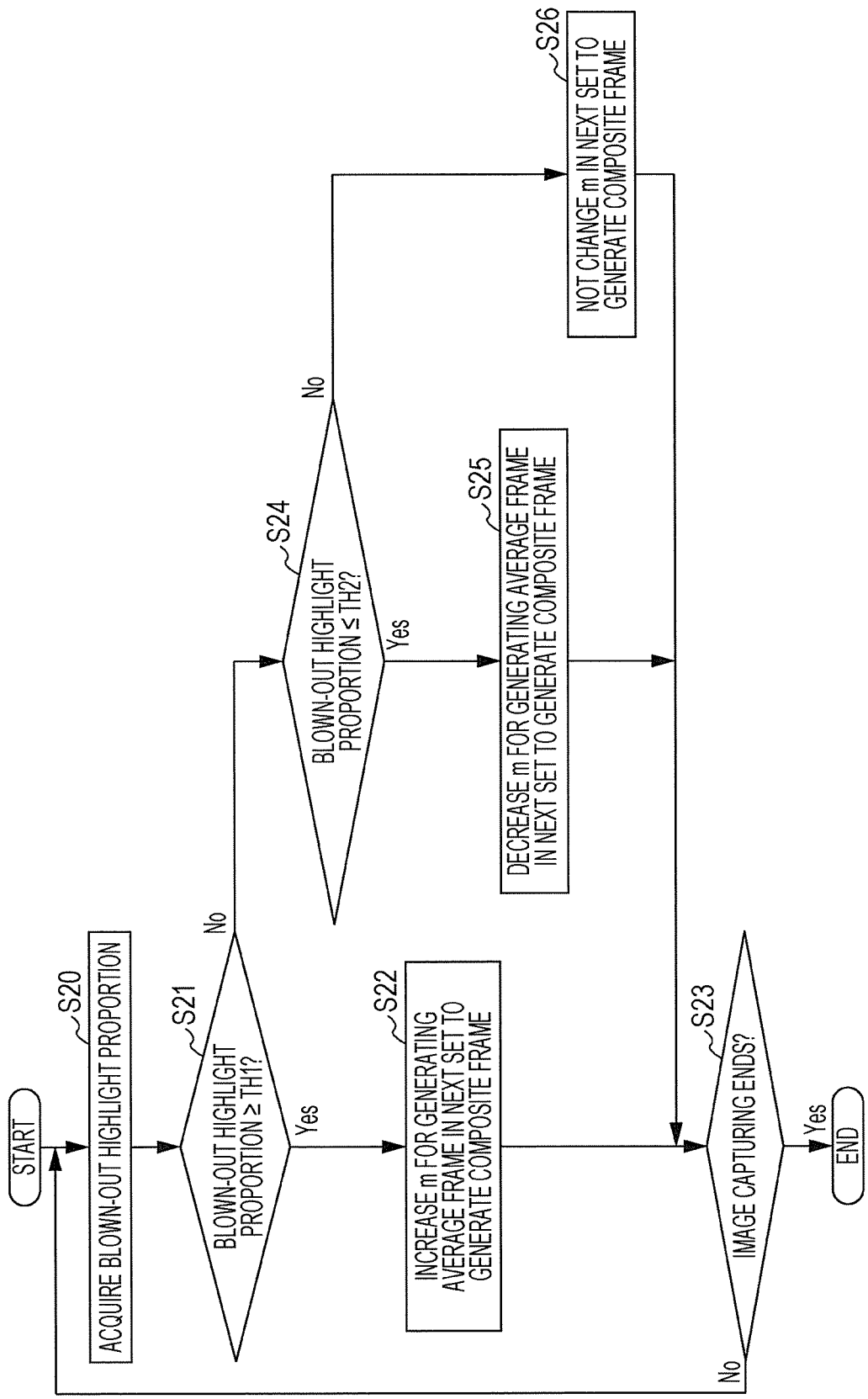
FIG. 8 is a flowchart illustrating an operation process by the image capturing apparatus.

FIG. 8 is a flowchart illustrating an operation process by the image capturing apparatus 1 according to this embodiment.

First, the blown-out highlight proportion calculation unit 111 calculates the proportion of blown-out highlight pixels in at least one of image data of the frame A, that of the frame B1, or that of the frame B2 (step S20). Thereafter, the exposure time setting unit 101 determines whether the proportion of blown-out highlight pixels is equal to or larger than the first threshold value (TH1) (step S21).

In a case where the proportion of blown-out highlight pixels is equal to or larger than TH1, the exposure time setting unit 101 makes an increase change to m, which is the number of frames having the second exposure time and forming the average frame, in the next set to generate a composite frame on the basis of the average frame (step S22).

In a case where the proportion of blown-out highlight pixels is smaller than TH1, the exposure time setting unit 101 determines whether the proportion of blown-out highlight pixels is equal to or smaller than TH2 (second threshold value) (step S24). In a case where the proportion of blown-out highlight pixels is equal to or smaller than TH2, the exposure time setting unit 101 makes a decrease change to m, which is the number of frames having the second exposure time and forming the average frame, in the next set to generate a composite frame on the basis of the average frame (step S25). In a case where the proportion of blown-out highlight pixels is larger than TH2, the exposure time setting unit 101 does not change m, which is the number of frames having the second exposure time and forming the average frame, in the next set to generate a composite frame (step S26). In this case, the dynamic range of the composite frame does not change.

Thereafter, the exposure time setting unit 101 determines whether image capturing ends (step S23). In a case where image capturing continues, the blown-out highlight proportion calculation unit 111 calculates again the proportion of blown-out highlight pixels in at least one of the frame A, the frame B1, or the frame B2 (step S20).

As described above, in this embodiment, the blown-out highlight proportion calculation unit 111 calculates the proportion of blown-out highlight pixels in at least one of image data of one frame having the first exposure time or image data of one frame having the second exposure time. On the basis of the proportion of blown-out highlight pixels, the exposure time setting unit 101 makes an increase change or a decrease change to the integer m in the next set. Accordingly, in this embodiment, the integer m is changed in accordance with the proportion of blown-out highlight pixels in the captured image. Therefore, the second exposure time is determined in accordance with the brightness of a scene for which an image is captured, and the average frame that is appropriate to the scene for which an image is captured can be generated.

Third Embodiment

Now, a third embodiment of the present invention is described. In this embodiment, in a case where a decrease change is made to the integer m in accordance with the proportion of blown-out highlight pixels, the proportion of blown-out highlight pixels in blown-out highlight check image data is checked before the decrease change to the integer m is made.

Figure 9:
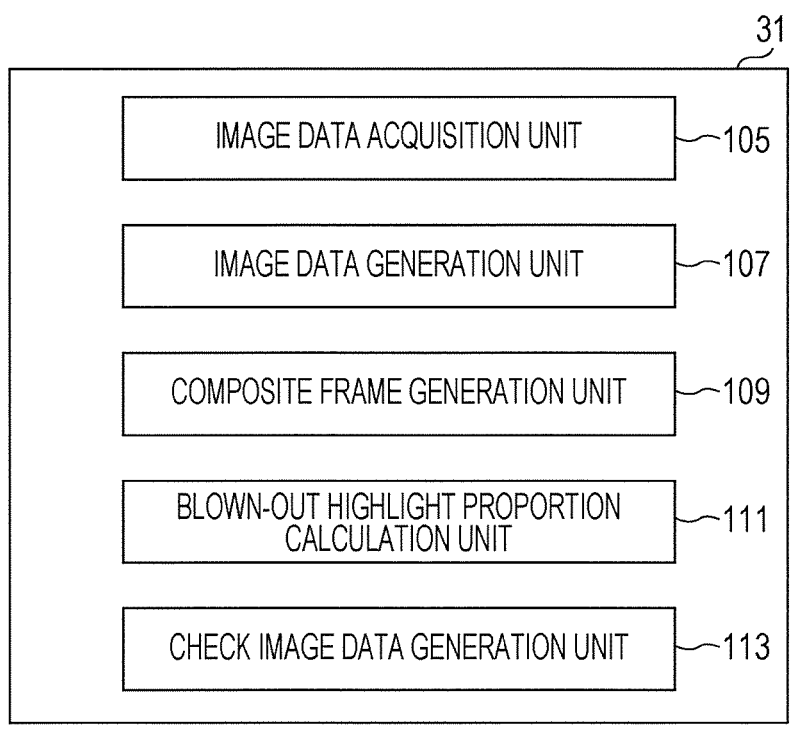
FIG. 9 is a block diagram illustrating an example functional configuration of the image processing unit.

FIG. 9 is a block diagram illustrating an example functional configuration of the image processing unit 31 according to this embodiment. The image processing unit 31 includes the image data acquisition unit 105, the image data generation unit 107, the composite frame generation unit 109, the blown-out highlight proportion calculation unit 111, and a check image data generation unit 113. The units already explained with reference to FIG. 3 and FIG. 7 are assigned the same reference numerals, and descriptions thereof are omitted.

In a case where a decrease change is made, the check image data generation unit 113 applies a check image digital gain to image data of one frame having the second exposure time before the decrease change is made to generate blown-out highlight check image data. Specifically, for example, in a case where a decrease change is made to the integer m so as to be decreased to the integer m−1, the check image data generation unit 113 applies a check image digital gain of m/(m−1)-fold to image data of one frame having the second exposure time to generate blown-out highlight check image data.

In this embodiment, the blown-out highlight proportion calculation unit 111 calculates the proportion of blown-out highlight pixels in the blown-out highlight check image data as well as the proportion of blown-out highlight pixels in at least one of image data of the frame A or image data of the frame B1 or the frame B2.

In a case where the proportion of blown-out highlight pixels in the blown-out highlight check image data is equal to or smaller than a third threshold value, the exposure time setting unit 101 makes the decrease change.

Figure 10:
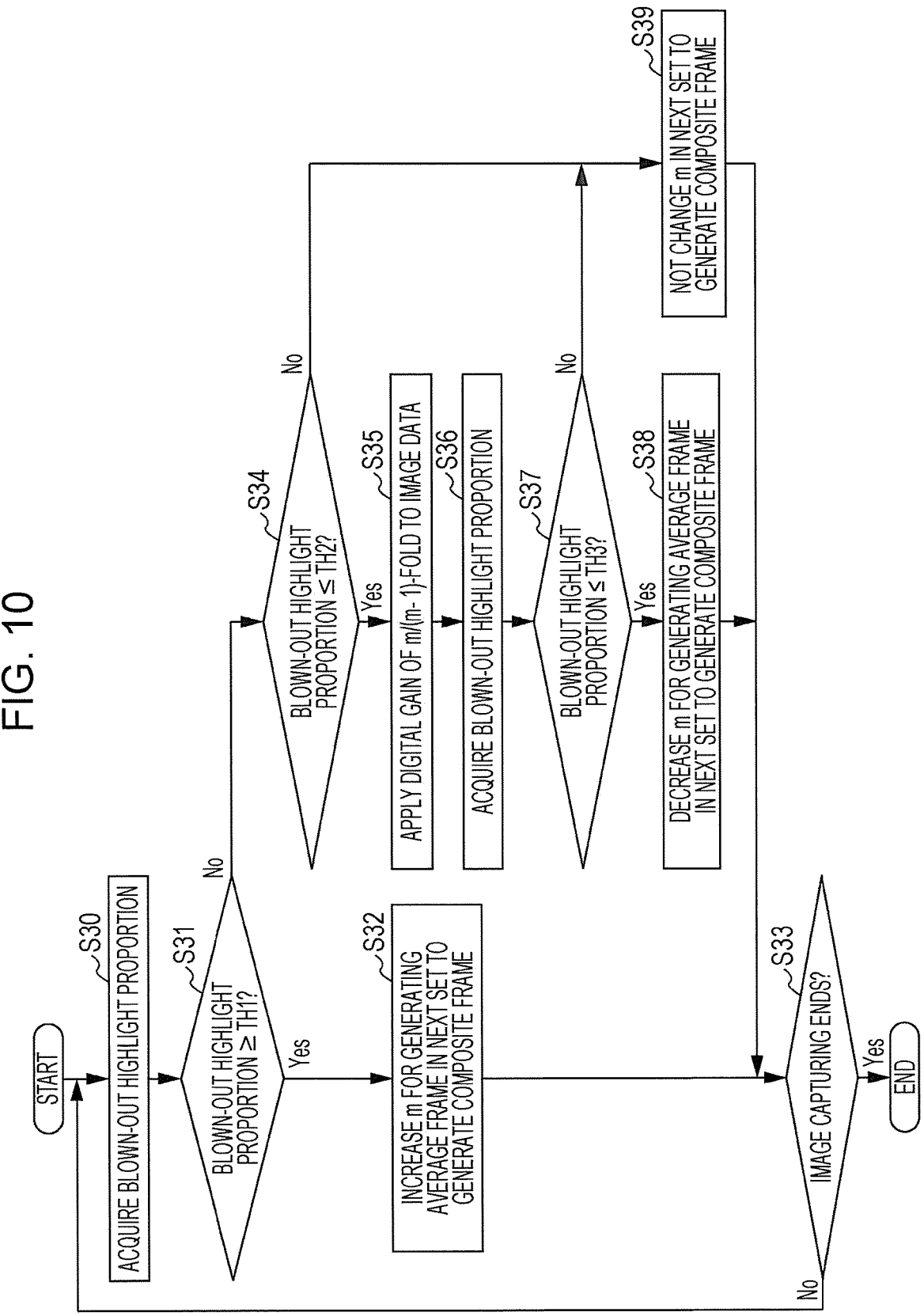
FIG. 10 is a flowchart illustrating an operation process by the image capturing apparatus.

FIG. 10 is a flowchart illustrating an operation process by the image capturing apparatus 1 according to this embodiment.

First, the blown-out highlight proportion calculation unit 111 calculates the proportion of blown-out highlight pixels in at least one of image data of the frame A, that of the frame B1, or that of the frame B2 (step S30). Thereafter, the exposure time setting unit 101 determines whether the proportion of blown-out highlight pixels is equal to or larger than the first threshold value (TH1) (step S31).

In a case where the proportion of blown-out highlight pixels is equal to or larger than TH1, the exposure time setting unit 101 makes an increase change to m, which is the number of frames having the second exposure time and forming the average frame, in the next set to generate a composite frame on the basis of the average frame (step S32).

In a case where the proportion of blown-out highlight pixels is smaller than TH1, the exposure time setting unit 101 determines whether the proportion of blown-out highlight pixels is equal to or smaller than TH2 (second threshold value) (step S34). In a case where the proportion of blown-out highlight pixels is equal to or smaller than TH2, the check image data generation unit 113 applies a digital gain of m/(m−1)-fold to image data of the frame B1 or the frame B2 to generate blown-out highlight check image data (step S35). Next, the blown-out highlight proportion calculation unit 111 calculates the proportion of blown-out highlight pixels in the blown-out highlight check image data (step S36). Thereafter, the exposure time setting unit 101 determines whether the proportion of blown-out highlight pixels in the blown-out highlight check image data is equal to or smaller than TH3 (step S37). In a case where the proportion of blown-out highlight pixels in the blown-out highlight check image data is equal to or smaller than TH3, the exposure time setting unit 101 makes the decrease change to m, which is the number of frames having the second exposure time and forming the average frame, in the next set to generate a composite frame on the basis of the average frame (step S38).

On the other hand, in a case where the proportion of blown-out highlight pixels in at least one of the frame A, the frame B1, or the frame B2 is larger than TH2 (No in step S34) or in a case where the proportion of blown-out highlight pixels in the blown-out highlight check image data is larger than TH3 (No in step S37), the exposure time setting unit 101 does not change m, which is the number of frames having the second exposure time and forming the average frame, in the next set to generate a composite frame (step S39). In this case, the dynamic range of the composite frame does not change.

Thereafter, the exposure time setting unit 101 determines whether image capturing ends (step S33). In a case where image capturing continues, the blown-out highlight proportion calculation unit 111 calculates the proportion of blown-out highlight pixels in at least one of the frame A, the frame B1, or the frame B2 (step S30).

In this embodiment, the proportion of blown-out highlight pixels after a decrease change to the integer m is checked with blown-out highlight check image data before the decrease change is made. Therefore, the occurrence of a situation where an increase change is made immediately after a decrease change to the integer m and a decrease change and an increase change are repeatedly made, resulting in fluctuations in changes in the dynamic range is reduced.

Fourth Embodiment

Now, a fourth embodiment of the present invention is described. In this embodiment, first gain-up image data for which a gain is changed in a stepwise manner is generated, and the composite frame generation unit 109 uses the first gain-up image data as image data of the average frame to generate a composite frame. Therefore, in a case where the dynamic range of a composite frame changes, the dynamic range is changed smoothly.

Figure 11:
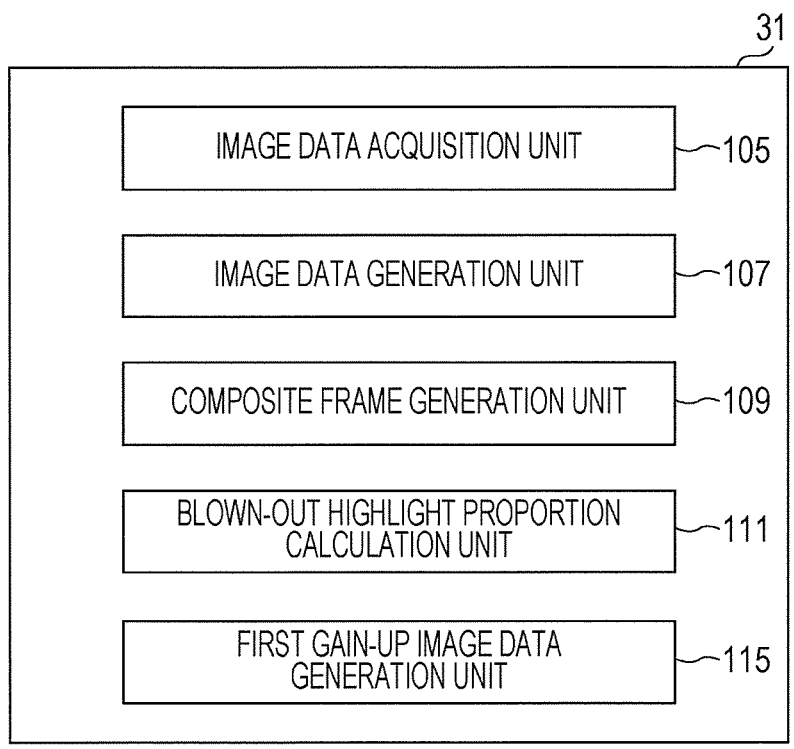
FIG. 11 is a block diagram illustrating an example functional configuration of the image processing unit.

FIG. 11 is a block diagram illustrating an example functional configuration of the image processing unit 31 according to this embodiment. The image processing unit 31 includes the image data acquisition unit 105, the image data generation unit 107, the composite frame generation unit 109, the blown-out highlight proportion calculation unit 111, and a first gain-up image data generation unit 15. The units already explained with reference to FIG. 3 and FIG. 7 are assigned the same reference numerals, and descriptions thereof are omitted.

In a case where an increase change has been made by the exposure time setting unit 101, the first gain-up image data generation unit 115 performs a first gain-up process for image data of the average frame after the increase change to generate first gain-up image data. In the first gain-up process, a first digital gain is decreased in a stepwise manner in accordance with a frame rate for recording or displaying a motion picture to generate first gain-up image data that comes close to the average frame after the increase change has been made to m. Specifically, in a case of an increase change from an integer m_a to an integer m_b, the first gain-up image data generation unit 115 decreases the first digital gain from m_b/m_a-fold to 1-fold in a stepwise manner. In the first gain-up process, gain-up is performed by a digital gain process and a signal value equal to or larger than a predetermined value is set to a constant value by an upper-limit process. The first gain-up image data generation unit 115 generates the first gain-up image data such that the dynamic range of the composite frame changes preferably over one second or more. Further, the first gain-up image data generation unit 115 generates the first gain-up image data such that the dynamic range of the composite frame changes preferably in 12 steps or more. That is, pieces of first gain-up image data for two frames are generated in each of the 12 steps, and the dynamic range changes over 24 frames and changes in a stepwise manner in one second in a motion picture of 24 fps.

FIG. 12 includes diagrams for explaining the first gain-up image data and dynamic range changes. Note that the vertical axis of each graph represents a signal value, and the horizontal axis thereof represents the dynamic range of the average frame.

Reference numeral 151 represents a signal value La (dynamic range D1) of the average frame for m=a before a change. Reference numeral 154 represents a signal value Lb (dynamic range D4) of the average frame for m=b after a dynamic range change. Note that a and b have a relationship of 2≤a<b. Reference numeral 152 and reference numeral 153 respectively represent first gain-up image data G1 in a first step and first gain-up image data G2 in a second step. The first gain-up image data G1 in the first step is generated by performing the digital gain process and the upper-limit process for the signal value of the average frame for m=b after the change. For the first gain-up image data G1 in the first step, the dynamic range is D2. The first gain-up image data G2 in the second step is generated by performing the digital gain process and the upper-limit process for the signal value of the average frame for m=b after the change. For the first gain-up image data G2 in the second step, the dynamic range is D3.

Figure 13:
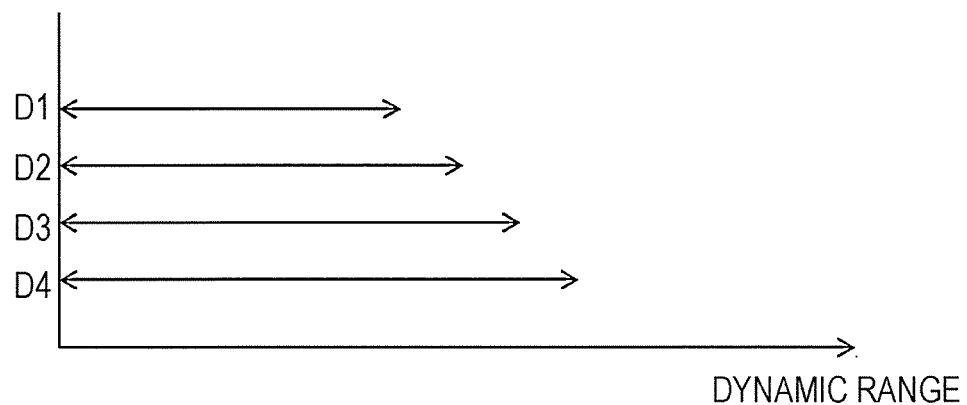
FIG. 13 is a diagram summarizing dynamic range changes.

FIG. 13 is a diagram summarizing the dynamic range changes explained with reference to FIG. 12. FIG. 13 illustrates the dynamic range changing from D1 to D2, D3, and D4 in the graphs indicated by reference numerals 151, 152, 153, and 154.

The dynamic range of the average frame changes from D1 to D4. When the dynamic range changes from D1 to D2, D3, and D4 in a stepwise manner, the dynamic range of the average frame can be changed smoothly.

Fifth Embodiment

Now, a fifth embodiment of the present invention is described. In this embodiment, the composite frame generation unit 109 uses second gain-up image data as image data of the average frame to generate a composite frame, and the dynamic range can be changed smoothly.

Figure 14:
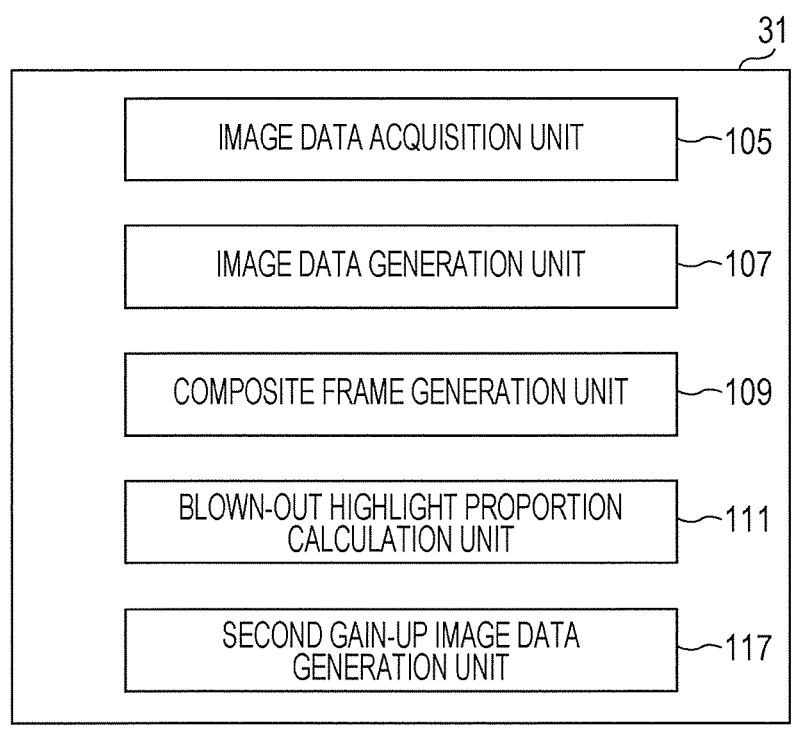
FIG. 14 is a block diagram illustrating an example functional configuration of the image processing unit.

FIG. 14 is a block diagram illustrating an example functional configuration of the image processing unit 31 according to this embodiment. The image processing unit 31 includes the image data acquisition unit 105, the image data generation unit 107, the composite frame generation unit 109, the blown-out highlight proportion calculation unit 111, and a second gain-up image data generation unit 117. The units already explained with reference to FIG. 3 and FIG. 7 are assigned the same reference numerals, and descriptions thereof are omitted.

In a case where a decrease change has been made by the exposure time setting unit 101, the second gain-up image data generation unit 117 performs a second gain-up process for image data of the average frame before the decrease change to generate second gain-up image data. A second digital gain is increased in a stepwise manner in accordance with a frame rate for recording or displaying a motion picture to generate second gain-up image data that comes close to the average frame after the decrease change has been made to m. Specifically, in a case of a decrease change from an integer m_c to an integer m_d, the second gain-up image data generation unit 117 increases the second digital gain from 1-fold to m_c/m_d-fold in a stepwise manner. In the second gain-up process, gain-up is performed by the digital gain process and a signal value equal to or larger than a predetermined value is set to a constant value by the upper-limit process. The second gain-up image data generation unit 117 generates the second gain-up image data such that the dynamic range of the composite frame changes preferably over one second or more. Further, the second gain-up image data generation unit 117 generates the second gain-up image data such that the dynamic range of the composite frame changes preferably in 12 steps or more. That is, pieces of second gain-up image data for two frames are generated in each of the 12 steps, and the dynamic range changes over 24 frames and changes in a stepwise manner in one second in a motion picture of 24 fps.

FIG. 15 includes diagrams for explaining the second gain-up image data and dynamic range changes. Note that the vertical axis of each graph represents a signal value, and the horizontal axis thereof represents the dynamic range of the average frame.

Reference numeral 155 represents a signal value Lc (dynamic range D5) of the average frame for m=c before a change. Reference numeral 158 represents a signal value Ld (dynamic range D8) of the average frame for m=d after a dynamic range change. Note that c and d have a relationship of c>d≥2. Reference numeral 156 and reference numeral 157 respectively represent second gain-up image data G3 in a first step and second gain-up image data G4 in a second step. The second gain-up image data G3 in the first step is generated by performing the digital gain process and the upper-limit process for the signal value of the average frame for m=c before the change. For the second gain-up image data G3 in the first step, the dynamic range is D6. The second gain-up image data G4 in the second step is generated by performing the digital gain process and the upper-limit process for the signal value of the average frame for m=c before the change. For the second gain-up image data G4 in the second step, the dynamic range is D7.

Figure 16:
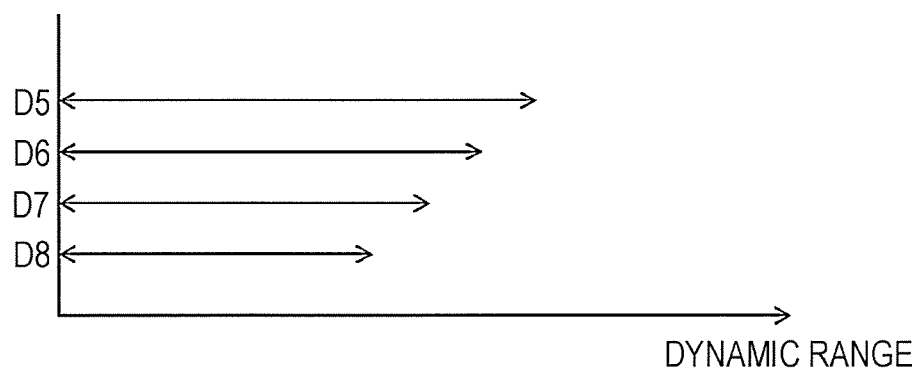
FIG. 16 is a diagram summarizing dynamic range changes.

FIG. 16 is a diagram summarizing the dynamic range changes explained with reference to FIG. 15. FIG. 16 illustrates the dynamic range changing from D5 to D6, D7, and D8 in the graphs indicated by reference numerals 155, 156, 157, and 158.

The dynamic range of the average frame changes from D5 to D8. When the dynamic range changes from D5 to D6, D7, and D8 in a stepwise manner, the dynamic range of the average frame can be changed smoothly.

Examples of the present invention have been described above; however, the present invention is not limited to the above-described embodiments, and various modifications can be made without departing from the spirit of the present invention as a matter of course.

REFERENCE SIGNS LIST

1 image capturing apparatus
8 display unit
10 external memory
12 lens
14 diaphragm
20 mechanical shutter
21 imaging element
22 processing unit
23 A/D conversion unit
24 main memory
25 system control unit
26 sensor driving unit
27 shutter driving unit
28 diaphragm driving unit
29 lens driving unit
30 control memory
31 image processing unit
32 compression/decompression unit
33 storage control unit
35 display control unit
36 user interface
101 exposure time setting unit
103 exposure control unit
105 image data acquisition unit
107 image data generation unit
109 composite frame generation unit
111 blown-out highlight proportion calculation unit
113 check image data generation unit
115 first gain-up image data generation unit
117 second gain-up image data generation unit
steps S10 to S14 image capturing method according to first embodiment
steps S20 to S26 image capturing method according to second embodiment
steps S30 to S39 image capturing method according to third embodiment

What is claimed is:

1. An image capturing apparatus comprising:
an imaging sensor; and
a processor configured to
set a first exposure time and a second exposure time shorter than the first exposure time, the second exposure time being an exposure time obtained by dividing the first exposure time by an integer m where m is an integer equal to or larger than 2;
control the imaging sensor to capture frames successively by repeatedly performing exposure including at least exposure for one frame having the first exposure time and exposure for m frames having the second exposure time as one set;
acquire image data of each frame from the imaging sensor;
generate image data of an average frame that is an average of pieces of image data of the m frames having the second exposure time in the one set; and
generate a composite frame for recording or displaying a motion picture of an extended dynamic range according to image data of the one frame having the first exposure time and the image data of the average frame,
wherein the processor is further configured to calculate a proportion of blown-out highlight pixels in at least one of the image data of the one frame having the first exposure time or image data of one frame having the second exposure time, and
make an increase change or a decrease change to the integer m in a next set on the basis of the proportion of blown-out highlight pixels.

2. The image capturing apparatus according to claim 1, wherein
the processor is further configured to make an increase change to the integer m in the next set in a case where the proportion of blown-out highlight pixels is equal to or larger than a predetermined threshold value.

3. The image capturing apparatus according to claim 1, wherein
the processor is further configured to make a decrease change to the integer m in the next set in a case where the proportion of blown-out highlight pixels is equal to or smaller than a predetermined threshold value.

4. The image capturing apparatus according to claim 2, wherein
the processor is further configured to make a decrease change to the integer m in the next set in a case where the proportion of blown-out highlight pixels is equal to or smaller than a predetermined threshold value.

5. The image capturing apparatus according to claim 1, wherein
the processor is further configured to make the increase change in a case where the proportion of blown-out highlight pixels is equal to or larger than a first threshold value and sets the second exposure time to an exposure time obtained by dividing the first exposure time by an integer m+1 in the next set.

6. The image capturing apparatus according to claim 1, wherein
the processor is further configured to
make the decrease change in a case where the proportion of blown-out highlight pixels is equal to or smaller than a second threshold value; and
set the second exposure time to an exposure time obtained by dividing the first exposure time by an integer m−1 in the next set.

7. The image capturing apparatus according to claim 2, wherein
the processor is further configured to
make the decrease change in a case where the proportion of blown-out highlight pixels is equal to or smaller than a second threshold value; and
set the second exposure time to an exposure time obtained by dividing the first exposure time by an integer m−1 in the next set.

8. The image capturing apparatus according to claim 3, wherein
the processor is further configured to
make the decrease change in a case where the proportion of blown-out highlight pixels is equal to or smaller than a second threshold value; and
set the second exposure time to an exposure time obtained by dividing the first exposure time by an integer m−1 in the next set.

9. The image capturing apparatus according to claim 4, wherein
the processor is further configured to
make the decrease change in a case where the proportion of blown-out highlight pixels is equal to or smaller than a second threshold value; and
set the second exposure time to an exposure time obtained by dividing the first exposure time by an integer m−1 in the next set.

10. The image capturing apparatus according to claim 5, wherein
the processor is further configured to
make the decrease change in a case where the proportion of blown-out highlight pixels is equal to or smaller than a second threshold value; and
set the second exposure time to an exposure time obtained by dividing the first exposure time by an integer m−1 in the next set.

11. The image capturing apparatus according to any one of claim 1, wherein
the processor is further configured to
apply a check image digital gain to image data of one frame having the second exposure time before the decrease change is made to generate blown-out highlight check image data;
calculate a proportion of blown-out highlight pixels in the blown-out highlight check image data, and
make the decrease change in a case where the proportion of blown-out highlight pixels in the blown-out highlight check image data is equal to or smaller than a third threshold value.

12. The image capturing apparatus according to claim 8, wherein
the processor is further configured to
apply the check image digital gain of m/(m−1)-fold to the image data of the one frame having the second exposure time to generate the blown-out highlight check image data, and
set the second exposure time in the next set to an exposure time obtained by dividing the first exposure time by an integer m−1 in a case where the proportion of blown-out highlight pixels in the blown-out highlight check image data is equal to or smaller than the third threshold value.

13. The image capturing apparatus according to claim 1, wherein
the processor is further configured to generate the first gain-up image data in which a first digital gain is decreased in a stepwise manner in accordance with a frame rate for recording or displaying the motion picture from the image data of the average frame after the increase change has been made; and
generate the composite frame according to the first gain-up image data.

14. The image capturing apparatus according to claim 13, wherein
the first gain-up image data generation unit decreases the first digital gain from m_b/m_a-fold to 1-fold in a stepwise manner in a case of the increase change from an integer m_a to an integer m_b.

15. The image capturing apparatus according to claim 1, wherein
the processor is further configured to
generate second gain-up image data in which a second digital gain is increased in a stepwise manner in accordance with a frame rate for recording or displaying the motion picture from the image data of the average frame before the decrease change is made, and
generate the composite frame according to the second gain-up image data.

16. The image capturing apparatus according to claim 15, wherein
the processor is further configured to increase the second digital gain from 1-fold to m_c/m_d-fold in a stepwise manner in a case of the decrease change from an integer m_c to an integer m_d.

17. An image capturing method comprising:
setting a first exposure time and a second exposure time shorter than the first exposure time, the second exposure time being an exposure time obtained by dividing the first exposure time by an integer m where m is an integer equal to or larger than 2;
controlling an imaging sensor to capture frames successively by repeatedly performing exposure including at least exposure for one frame having the first exposure time and exposure for m frames having the second exposure time as one set;
acquiring image data of each frame from the imaging sensor;
generating image data of an average frame that is an average of pieces of image data of the m frames having the second exposure time in the one set;
generating a composite frame for recording or displaying a motion picture of an extended dynamic range according to image data of the one frame having the first exposure time and the image data of the average frame;
calculating a proportion of blown-out highlight pixels in at least one of the image data of the one frame having the first exposure time or image data of one frame having the second exposure time; and
making an increase change or a decrease change to the integer m in a next set on the basis of the proportion of blown-out highlight pixels.

18. A non-transitory computer readable medium for storing a program causing a computer to perform an image capturing method comprising:

setting a first exposure time and a second exposure time shorter than the first exposure time, the second exposure time being an exposure time obtained by dividing the first exposure time by an integer m where m is an integer equal to or larger than 2;

controlling an imaging sensor to capture frames successively by repeatedly performing exposure including at least exposure for one frame having the first exposure time and exposure for m frames having the second exposure time as one set to control exposure;

acquiring image data of each frame from the imaging unit;

generating image data of an average frame that is an average of pieces of image data of the m frames having the second exposure time in the one set;

generating a composite frame for recording or displaying a motion picture of an extended dynamic range according to image data of the one frame having the first exposure time and the image data of the average frame;

calculating a proportion of blown-out highlight pixels in at least one of the image data of the one frame having the first exposure time or image data of one frame having the second exposure time; and making an increase change or a decrease change to the integer m in a next set on the basis of the proportion of blown-out highlight pixels.

* * * * *